C. E. WHITE.
ADJUSTABLE SPOOL FOR MUSIC ROLLS.
APPLICATION FILED JUNE 7, 1919.
1,333,953.
Patented Mar. 16, 1920.
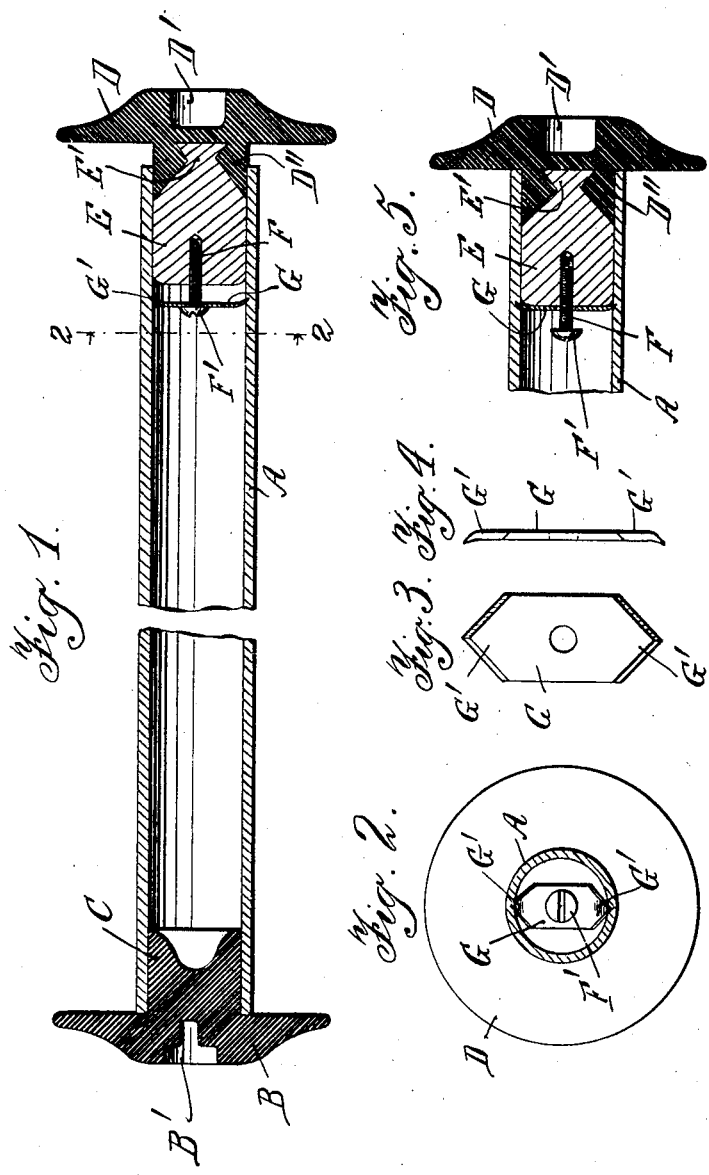
Inventor
Clinton Evans White
By his Attorney
John Lotka

UNITED STATES PATENT OFFICE.

CLINTON E. WHITE, OF NEWARK, NEW JERSEY.

ADJUSTABLE SPOOL FOR MUSIC-ROLLS.

1,333,953.  Specification of Letters Patent.  Patented Mar. 16, 1920.

Application filed June 7, 1919. Serial No. 302,537.

*To all whom it may concern:*

Be it known that I, CLINTON EVANS WHITE, a citizen of the United States, and resident of Newark, in the county of Essex and State of New Jersey, have invented certain new and useful Improvements in Adjustable Spools for Music-Rolls, of which the following is a specification.

Music-rolls such as are used for self-playing musical instruments, and particularly for pneumatically-operated pianos and the like, are customarily wound on a core or spool. The width of these rolls or sheets is not always exactly the same, and for this reason, and also for greater convenience in re-rolling, as set forth hereinafter, it is desirable to provide means whereby the length of the roll or spool may be adjusted within certain limits. While various constructions for this purpose have been devised and patented, I have sought to further improve constructions of this character, and the new construction disclosed in my present application offers especial advantages as to simplicity, low cost of manufacture, and satisfactory operation.

Without desiring to restrict myself to the exact details represented, I have illustrated in the accompanying drawings a typical and preferred form of my present invention. Figure 1 is a longitudinal section of my improved music-roll spool, showing the same adjusted to its maximum length; Fig. 2 is a cross section on line 2—2 of Fig. 1; Fig. 3 is a face view of the connector or anchor employed in this invention; Fig. 4 is an edge view of said connector or anchor; and Fig. 5 is a partial longitudinal section showing the right-hand portion of Fig. 1 adjusted to the position of minimum spool length.

The body A of the spool may be made as a cylindrical tube of spirally-wound cardboard, or in any other suitable manner to form a support for the music-sheet, the latter being generally of the well-known perforated character for the control of a pneumatic action. At one end of this body or support A I provide a head B, having the customary diametrical slot B' which serves to connect the spool with the mechanism (not shown) used for supporting and winding or rotating the spool. Said head B in this particular instance is shown as made with a projection C extending axially into the body A. This head B is usually made of hard rubber or similar composition or material, the head B being suitably connected with the body A, so that the head B will be stationary with reference to the body or core A. Wetting the projection C with alcohol will make it sticky so that it will adhere to the inside of the body A.

At the other end of the spool, I have shown an adjustable head D, preferably made of hard rubber or other suitable material or composition and formed with the cylindrical or slightly conical socket D' customarily provided for the reception of the pin or like part of the mechanism for supporting this end of the spool. The head D, like the head B, C, has a flange for engaging the edge of the music-sheet or roll, and is formed with an axial projection D'' extending, with a sliding fit, into the adjacent end of the hollow or tubular body A. A cylindrical wooden plug E may form an inward extension of the projection D'', said plug having the same diameter as the projection, and therefore sliding contact with the inner wall of the tubular body A; the plug E is rigidly connected to the projection D'', as by molding the projection around it, see Figs. 1 and 5. The plug is shown as having a reduced and dovetailed end E' extending into the projection D'', the latter thus having a recess or socket at its inner end, as shown, to receive the correspondingly-formed outer end of the plug or extension E, so as to obtain a better connection between these parts.

The plug or extension E of the head D is provided at its inner end with an axial bore into which fits the longitudinal pin or screw F, having a head F' at its free or inner end. It will be understood that the extension or plug E, being secured to the head D rigidly, practically forms part thereof; in fact, the parts D, E might be made integral with each other, but I prefer the two-piece construction shown for the reason that the exposed portion D, which engages the note-sheet, performs its function better when made of hard rubber or similar material, and is more readily produced in quantities from such material than if made of wood, whereas wood is preferred for the extension E on account of its affording a better hold for the pin or screw F. The pin F is normally stationary relatively to the head D, E, yet by screwing said pin in or out, the distance between the head F' and the inner end of the head D, E may be reduced or increased. Now, this distance or clearance determines the longitudinal play of the head D, E relatively to the body A, owing to the following construction: The pin or screw F extends loosely through a connector or anchor G, that is to say, said part G has an opening of sufficient diameter to allow the part G to slide freely lengthwise of the pin F as long as the parts D, E, F, G are separate from the body A. Of course, the head F' is larger than the opening in the anchor G, so as to form a stop. Having adjusted the head F' to the proper distance from the head D, E, the workman assembling the roll or spool will introduce the connector or anchor G and the parts D", E of the head into the hollow body A until the position Fig. 5 is reached. It will be observed that the connector or anchor G is of a length slightly greater than the diameter of the interior of the tube or body A, but this member G is made of steel or other elastic material so that it will bend slightly as the head D, E, is pushed in, and moreover, the free ends of the member G, which is in the nature of a narrow plate or strip, see Fig. 3, are bent slightly toward the head D, E, even in their original condition, Fig. 4. It is thus easy to place the anchor or connector G within the hollow support or body A, by pushing the head D, E into the position shown in Fig. 5. It will be seen that in this position the head F' is spaced from the connector G, so that, with this connector remaining stationary with reference to the body A, the head D, E, F is capable of a limited longitudinal movement or adjustment within the limits indicated by Figs. 1 and 5. When the position Fig. 1 is attained, a further pull on the head D will have no effect beyond placing a strain on the connector G. The outer ends G' of this connector will then simply be driven more deeply into the material of the tube or body A, and this result may be enhanced by giving these ends the shape of V-points, see Figs. 2 and 4, and preferably, the edges of these V-points are sharpened on the side toward the head D, E, so that these edges will more readily cut into, and become anchored in, the inner wall of the tube or body A. Thus it will be understood that the connector or anchor G, when once brought to the position Fig. 5, is secured to the tube or supporting body A firmly and permanently. The longitudinal play of the head D, E, F allows it to be adjusted to accommodate music-rolls or sheets of different widths (within certain limits). This longitudinal play is also of advantage in re-rolling, when by bringing the adjustable head inward until its flange touches the edge of the note-sheet, the sheet rolled or coiled on the core or body A will thus be adjusted or straightened so that it will run perfectly true.

While I have shown the interior of the core A as a chamber of circular cross section (Fig. 2), the projection D" and the plug or extension E having cylindrical outer surfaces to engage the cylindrical inner wall of said chamber, it will be obvious that the cross section might be of different shape, as long as it is uniform throughout the length of the engaging surfaces, so that they may properly slide one on the other. Furthermore, while Fig. 1 shows an adjustable head at one end only of the core, and a stationary head at the other, I might, if preferred, provide at each end of the core an adjustable head of the character represented at the right of Fig. 1, but I consider it more satisfactory to have one head stationary and the other adjustable. The modifications above referred to, and others, may be made without departing from the nature of my invention as set forth in the appended claims.

I claim as my invention:

1. A music-roll spool comprising an elongated body or core with heads at each end, one end of said core being hollow, and the head which is adjacent to said end being formed with a projection extending inwardly from the flange of the head into said hollow end of the core, the outer surface of said projection and the inner surface of the core end being in longitudinal sliding engagement with each other and of uniform cross section throughout their operative length, a pin carried by said head and projecting therefrom longitudinally within the said hollow core end, and provided with a head, and an anchor secured within the hollow core end between the head of said pin and the body of the sliding head, said anchor having an opening large enough for the sliding passage of said pin, but small enough to arrest the passage of said pin head.

2. A music-roll spool comprising an elongated core with flanged heads at each end, one end of said core being hollow, and the head which is adjacent to said end being formed with a projection extending inwardly from the flange of said head into said hollow end of the core, the outer surface of said projection and the inner surface of the core end being in longitudinal sliding engagement with each other and of uniform cross section throughout their operative length, a screw fitted into the inner end of said projection and extending lengthwise within said hollow core end, to share in the longitudinal movement of said head, said screw being provided with an enlargement or head at its inner or free end, and an anchor secured to the core within the hollow end thereof, between the enlargement of said screw and said projection of the adjustable flanged head, said anchor having an opening large enough for the sliding passage of said screw, but small enough to arrest the passage of the screw head.

3. A music-roll spool comprising an elongated core with flanged heads at each end, one end of said core being hollow, and the head which is adjacent to said end being formed with a projection extending inwardly into said hollow end of the core, and in longitudinal sliding engagement with the inner wall of said end, an anchor secured to said core within said hollow end, and a member carried by said head and adjustable relatively thereto longitudinally, said member sharing the longitudinal movement of the head and extending lengthwise of the core through the said anchor, and provided, on the side of the anchor opposite to said head, with an enlargement adapted to engage said anchor when the head is moved outward and to thus stop the outward movement of the head.

4. A music-roll spool comprising an elongated core with heads at each end, one end of said core being hollow, and the head which is adjacent to said end being formed with a projection extending into said hollow end of the core, and in longitudinal sliding engagement therewith, an anchor extending transversely within the hollow end of the core and having its ends bent toward the outer end of the core cavity and in locking engagement with the inner wall of said cavity, and a motion-limiting member connected with said sliding head and extending lengthwise of the core in said cavity and through said anchor, and provided with means to engage said anchor and limit the outward movement of the said head.

5. A music-roll spool comprising an elongated core having a hollow end, an adjustable head located adjacent to said end and formed with a projection extending into said end and in longitudinal sliding engagement therewith, an anchor extending transversely within the hollow core end and having its ends pointed in V-shape and in locking engagement with the inner wall of the core cavity, and a motion-limiting member connected with the adjustable head and extending lengthwise of the core in said cavity and through said anchor, and provided with means to engage said anchor and limit the outward movement of said head.

6. A music-roll spool comprising an elongated core having a hollow end, an adjustable head formed with a projection extending into said end and in sliding engagement therewith, an anchor extending across the hollow core end and having ends pointed in V-shape bent and sharpened toward the outer end of the core cavity, and in locking engagement with the inner wall of said cavity, and a motion-limiting member connected with the adjustable head and coöperating with said anchor to limit the outward movement of the adjustable head.

In testimony whereof I have signed this specification.

CLINTON E. WHITE.